United States Patent Office 3,758,337
Patented Sept. 11, 1973

3,758,337
SODIUM-SULPHUR ACCUMULATOR WITH TEMPERATURE CONTROLLING MEANS
Jacques Fally, Orsay, Jacques Richez, Clamart, Claude Lasne, Antony, and Yvon Lazennec, Saint Michel-sur-Orge, France, assignors to Compagnie Generale d'Electricite, Paris, France
Filed Dec. 21, 1971, Ser. No. 210,345
Claims priority, application France, Dec. 21, 1970, 46,046
Int. Cl. H01m 43/00
U.S. Cl. 136—6 FS    8 Claims

ABSTRACT OF THE DISCLOSURE

Sulphur-sodium accumulator for producing electrical energy comprises a container having a plurality of tubes of which at least the lower portion is intended to be used as a solid electrolyte. An electronic conductive material, such as graphite felt, impregnated in the charged state, with sulphur, is arranged in the container at least around that portion of the tubes forming the electrolyte. All the tubes are connected to a common sodium tank, while cooling means is positioned between the tubes and the tank.

BACKGROUND OF THE INVENTION

Field of the invention

The present invention concerns sodium-sulphur type accumulators as well as batteries composed of such accumulators.

Description of the prior art

The production of unitary electro-chemical elements of the sodium-sulphur type comprising a tube, in which at least the lower portion is provided to act as a solid electrolyte, is at present known in the art. Generally, that portion consists of alumina beta-sodium salt. Inside that tube, the active negative material, for example, sodium, is arranged. At least the portion of the tube forming the electrolyte is inserted in a container comprising a lining formed by a conductive material, such as graphite impregnated with active positive materials, for example, sulphur. Such elements operate at a temperature in the order of 350° C. so as to cooperate with melted reagents and reagent products.

Work carried out to date has enabled only the production of low-power sodium-sulphur type generators, for example, in the order of 50 or so watts, not suitable for industrial applications.

SUMMARY OF THE INVENTION

One aim of the invention is to provide a high-power sodium-sulphur type generator, for example in order of 5 kw., which can be used more particularly in automobile vehicles for their propulsion. Of course, this requires that in such a generator, the problems connected with the maintenance of the temperature be solved in a satisfactory way.

The present invention has for its object a sodium-sulphur type accumulator, comprising, inside a container, a plurality of tubes arranged substantially parallel to one another, whose lower portion at least is provided to act as a solid electrolyte. All of the tubes are connected to a common tank containing an active negative material. The container comprises at least up to a height corresponding substantially to that of the portion of the tubes used as an electrolyte, a lining formed by an electronic conductive material, impregnated with an active positive material. The accumulator further having cooling means that direct their effect mainly at the level of the connections between the tubes and the common tank.

The container can be metallic and thus form one pole of the accumulator.

Metal current extractor plates having holes for the tubes to pass through, are electrically connected with the walls of the container and can be arranged inside the container. These current extractor plates can be arranged substantially parallel and can be made fast by means of vertical locating pieces.

The extractor plates are provided with small holes enabling the migration of the products that impregnate the conductive material. They can be provided with rough portions to ensure fixing of the material. These small holes and these rough portions can be formed by a single cutting operation.

Only the lower portions of the tubes which are to act as electrolytes can consist of beta alumina-sodium salt. The upper portions of the tubes can be formed by alpha alumina, the connection between these various portions being effected by welding, by means, for example, of an appropriate glass or enamel.

According to one embodiment of the invention, the tank containing the active negative material is connected to the tubes through a distributor. Moreover, between the tank and that distributor, a system enabling the regulation of the flow of active negative material can be arranged; this can be a valve or diaphragm device or a wick. The distributor can have the shape of a cup having holes through which the upper ends of the tubes are inserted. Means are, of course, provided for ensuring fluid-tight sealing between the distributor and the tubes.

BRIEF DESCRIPTION OF THE DRAWINGS

Other characteristics of the invention will become apparent from the following description and the accompanying drawings in which.

DESCRIPTION OF THE PREFERRED EMBODIMENT

Figure 1:
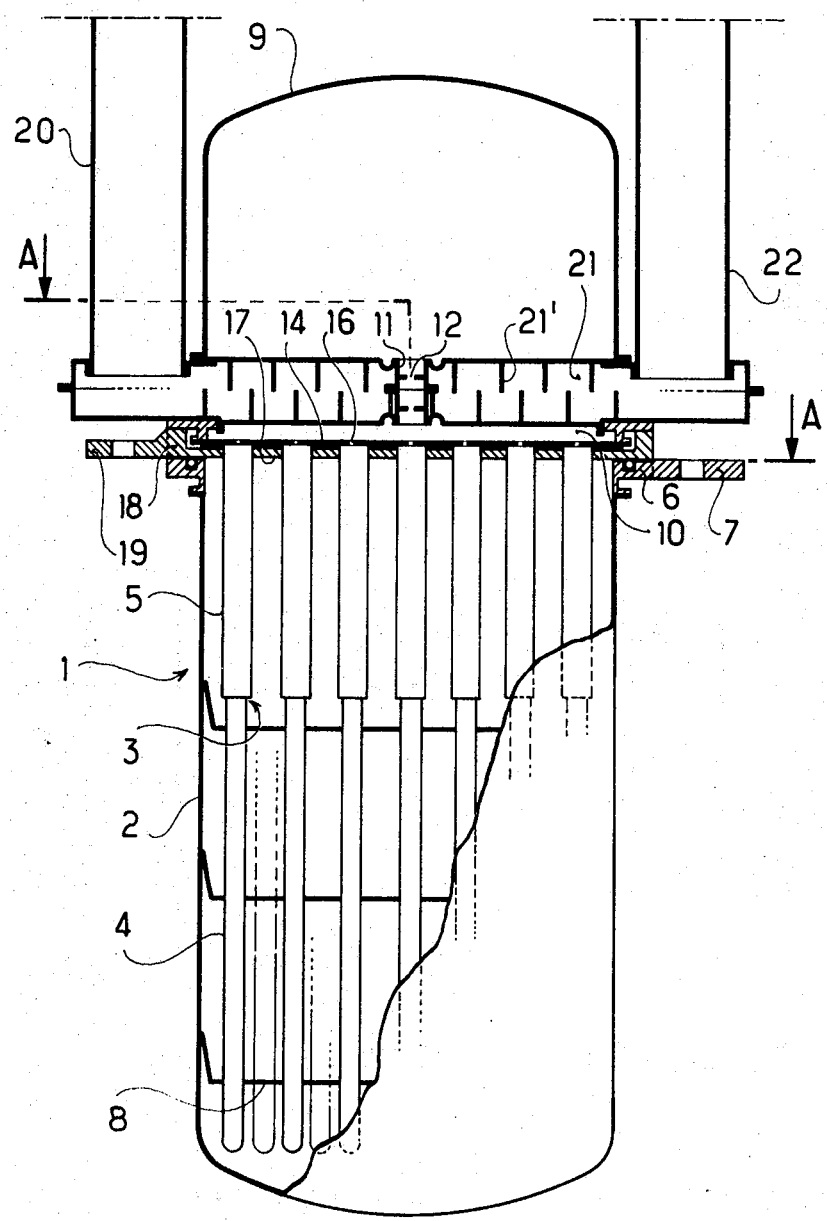
FIG. 1 shows diagrammatically a sodium-sulphur accumulator according to the invention.

In FIG. 1, reference 1 designates an accumulator according to the invention. That accumulator comprises a container 2, having a cylindrical shape, which can be formed, for example, by a stainless steel or mild steel sheet, surface treated for resistance against corrosion by sulphur and polysulphides.

The stipulated thickness for the wall of that container can be, for example, in the order of 0.8 mm.

Figure 2:
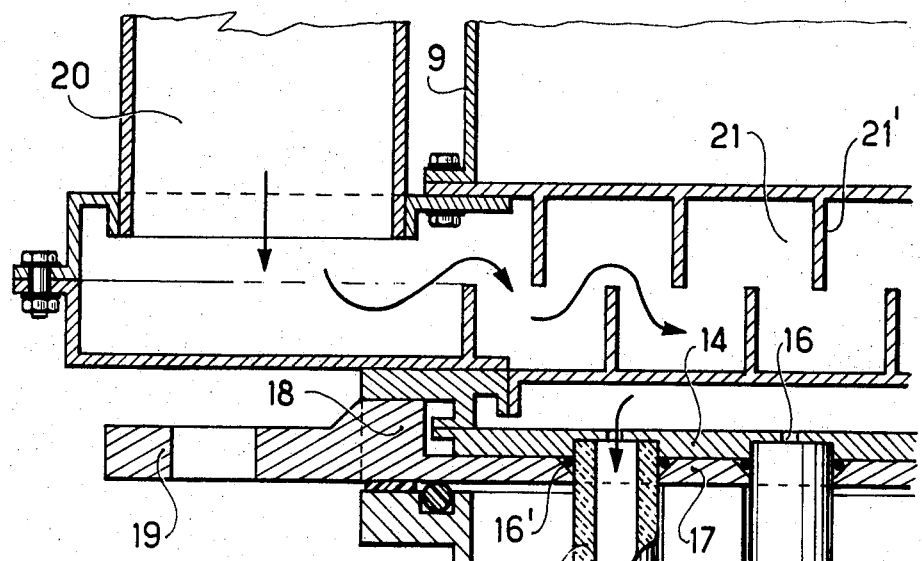
FIG. 2 is a partial, enlarged view of FIG. 1.
Figure 2:
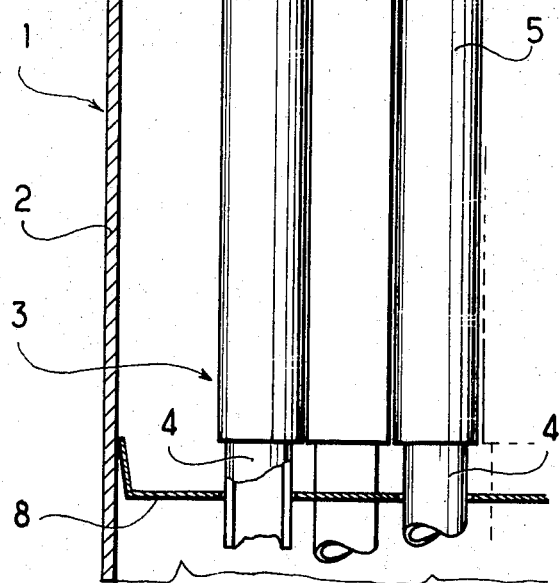

Reference 3 designates tubes closed at their lower end, arranged parallel to one another. These tubes are intended for containing the sodium. As is shown clearly in FIG. 2, these tubes can consist of two portions connected together, for example, by welding: a lower portion 4 intended for forming the solid electrolyte and an upper portion 5. The lower portion 4 can be made of a beta alumina-sodium salt and the upper portion 5 can be made of alpha alumina. The dimensions of the beta alumina portion of the tube can be, for example: outside diameter 8 mm., inside diameter 7 mm. The dimensions of the upper alpha alumina portion of the tube can be, for example: outside diameter from 5 to 10 mm., inside diameter: from 0.5 to 5 mm.

In any case it is advantageous for the inside diameter of the upper portion 5 of the tube to be smaller than the inside diameter of the lower portion 4. The container 2 is lined around the tubes 3 and at least up to a height corresponding to the portion 4 of the tubes, with a porous conductive material, such as a graphite felt, impregnated, in the charged state, with sulphur. For clearness sake, this material has not been shown in the drawing. The upper end of the container 2 comprises a flange 6, provided, in the example shown, with two tabs 7 forming the positive terminals of the accumulator.

The conductive material, such as graphite felt, can be in the form of plates drilled with holes corresponding to the tube holes. These plates can be stacked in the form of horizontal beds, for example, having a thickness of 5 mm. In order to decrease the resistive drop in the cathode, metal current extractor plates 8 are inserted regularly between the beds. These plates can be formed by the same material as that of the container 2. The plates 8 are provided, on their periphery, with tabs, which can be drilled with holes, so as to lighten them, and are intended for bearing elastically against the internal wall of the container 2.

Figure 3:
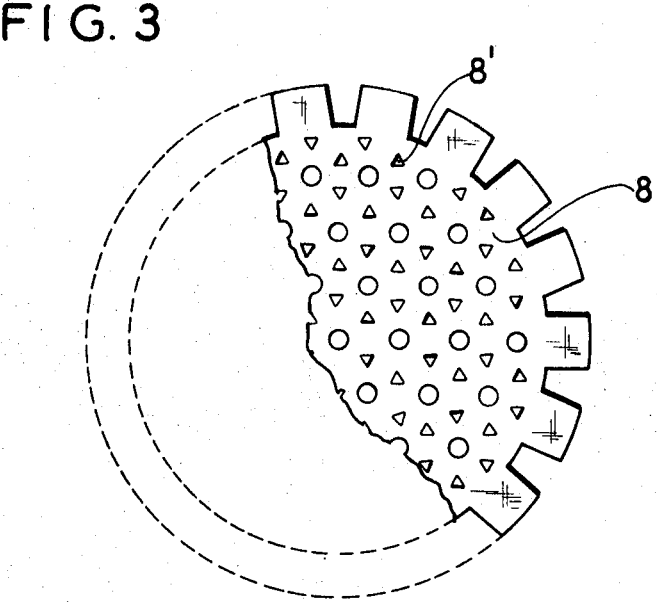
FIG. 3 is a plane view of a current extractor plate provided for installing in the accumulator.
Figure 4:
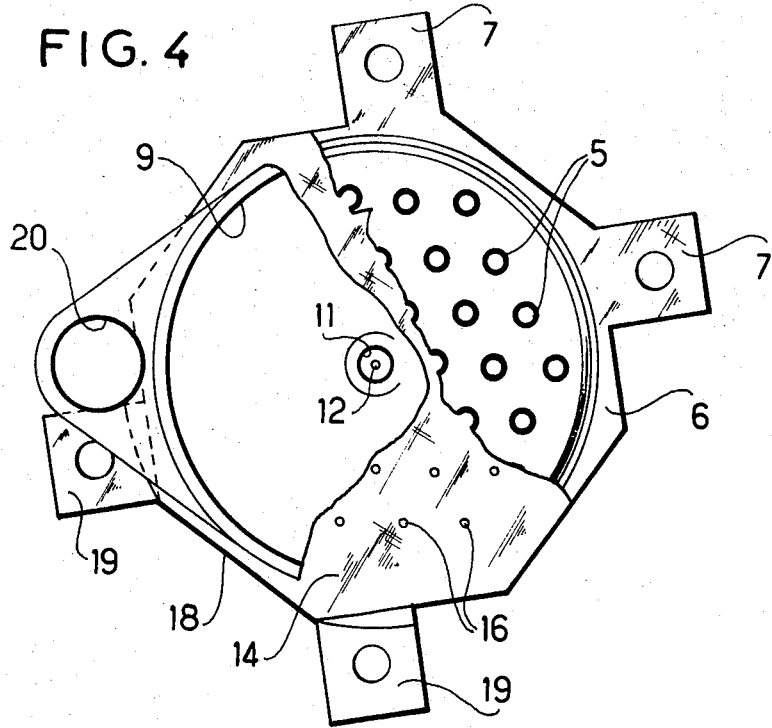
FIG. 4 is the section A—A of the accumulator in FIG. 1.

FIG. 3 is a top view of such a plate before installing in the container 2 and before the partial bending back of the tabs. The plates 8 can be provided on both their faces with rough portions intended for fixing the conductive material; they can also comprise holes enabling more particularly the migration of polysulphides. These rough portions and holes are designated in FIG. 3 by the reference 8' and can be obtained by a single swaging operation. To great advantage, the plates 8 are linked together by vertical distance pieces, which have not been shown. In this way, the mechanical stresses induced by the great contraction in volume of the sulphur and sodium polysulphides on solidifying can be eliminated. The assembly formed by the plates 8 and the vertical distance pieces linking them together enables optimum tightening of the conductive material, and above all, ensures the reproductibility of such tightening.

The reference 9 designates the sodium tank common to all the tubes 3. This reservoir can be made of a stainless steel sheet having a thickness of about 1 mm. It can be obtained by swaging. The tubes 3 are fed through a distribution chamber 10, a flow regulating system being provided in the example shown, between the reservoir 9 and the chamber 10. This flow regulating system comprises, in this embodiment, a manifold 11 provided with two diaphragms 12. The part it plays is the prevention of a flow of melted sodium towards the container in the case of breakage of the tubes 3. A valve system or wick system could be provided instead of the diaphragms.

The chamber 10 is limited by metal parts forming a cup, provided at its bottom, with passages for inserting the upper portions 5 of the tubes 3. Holes 16 are provided for draining the sodium. In order to obtain excellent fluid-tight sealing, the ends of the tubes are provided with O-rings 16', made of silicone rubber, for example, which are tightly inserted between the bottom 14 of the cup and a plate 17 fixed onto the bottom. The upper part of the distribution chamber is formed by a metal wall forming a part of the cooling system. As shown in the figures, the plate 17 comprises, on its periphery, a flange 18 which, in the example shown, is provided with two tabs 19 forming the negative terminals of the accumulator. The flanges 6 and 18 are linked, after insulating means such as silicone rubber washers or seals, for example, have been inserted between them. This linking can be effected by suitably insulated screws, or by any other appropriate means, such as sealing by a glass or an enamel, for example.

The cooling means connected with the accumulator comprise a manifold 20 opening into a cooling chamber 21 placed between the distribution chamber 10 and the lower part of the tank 9. The chamber 21 surrounds the manifold 11. The cooling fluid, for example, air, escapes from the chamber 21 through a manifold 22. The walls of the chamber 21 can be provided with metal fins 21' intended for improving the cooling.

In the charged state, the sodium fills up the greater part of the tank 9. In the discharged state, sodium remains only in the bottom of the tank. The excess of calories supplied by the internal joule effects is evacuated through the sodium filling the tubes. Consequently, so that the cooling means act always effectively, it is important that this action should take place mainly at a level of the accumulator corresponding always to a filling with sodium; that is why the cooling chamber 21 is arranged at the level of the connection of the tubes to the sodium tank. If cooling took place mainly at the upper portion of the sodium tank, the results would be that, when discharging has ended, that is, when the tank is practically empty, the extraction of the excess of calories by the walls of the tank would be insufficient.

This arrangement of the cooling chamber 21 therefore ensures the following advantages:

(1) The heat to be evacuated is generated mostly in the walls of the lower portions 4 of the tubes 3, by joule effect. The sodium which fills the tubes 3 being an excellently heat-transmitting fluid, it is most convenient to evacuate the heat at the input of these tubes. This evacuation is effected from the distribution chamber 10, which is also filled with sodium in contact with that fills the tubes 3. It is the lower wall of the chamber 21 which ensures this evacuation, with a minimum thermal resistance between the point at which heat is generated and that at which it is evacuated.

(2) The upper wall of that cooling chamber cools the sodium of the tank 9, even when the latter is almost empty, for that upper wall is always covered with liquid sodium.

(3) Heat evacuation is effected with the same effectiveness for the tubes in the center of the accumulator as for those on its periphery, thus ensuring a good homogeneity of the temperature. Furthermore, so as to avoid too high a temperature at the connections 16', the inside diameter of the portion 5 of the tubes 3 is produced with a smaller dimension than the inside diameter of the portion 4 which acts as an electrolyte.

By way of an illustration only, the accumulator 1 can comprise 37 tubes. The positive and negative current take-up tabs can be treated, for example, by bonding with silver so as to reduce the contact resistances when using series connection.

Figure 5:
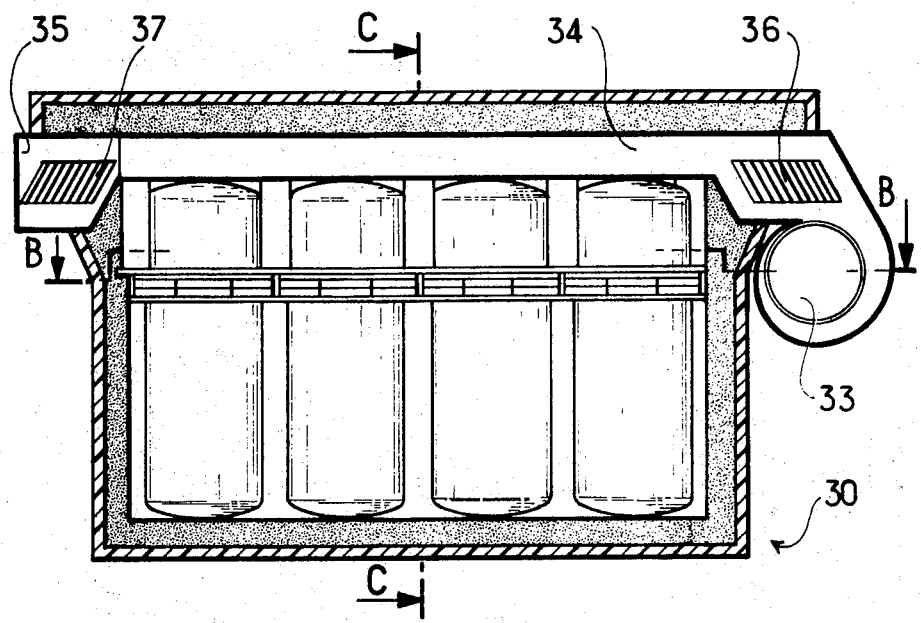
FIG. 5 shows, diagrammatically, a sectional view of an accumulator battery produced by assembling, in series, accumulators similar to those shown in FIG. 1.
Figure 6:
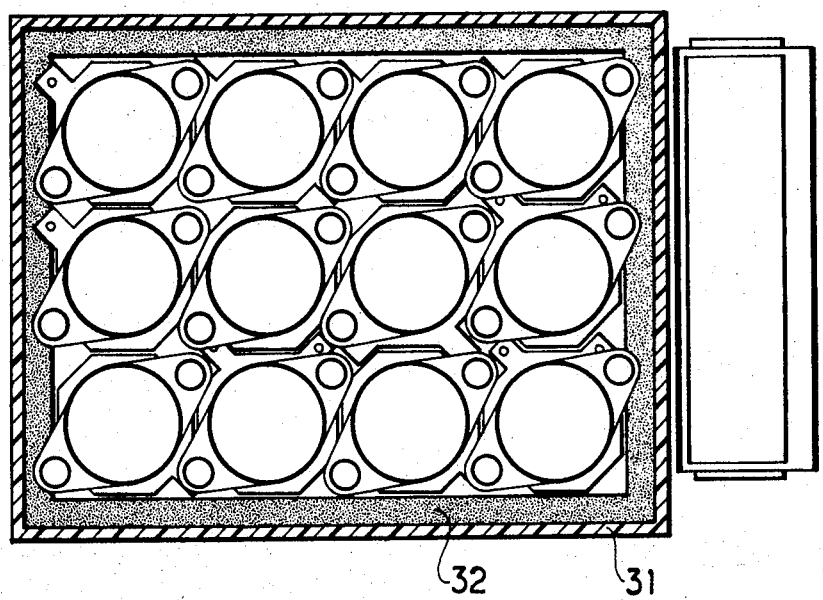
FIG. 6 is a horizontal sectional view of FIG. 5 along line B—B.
Figure 7:
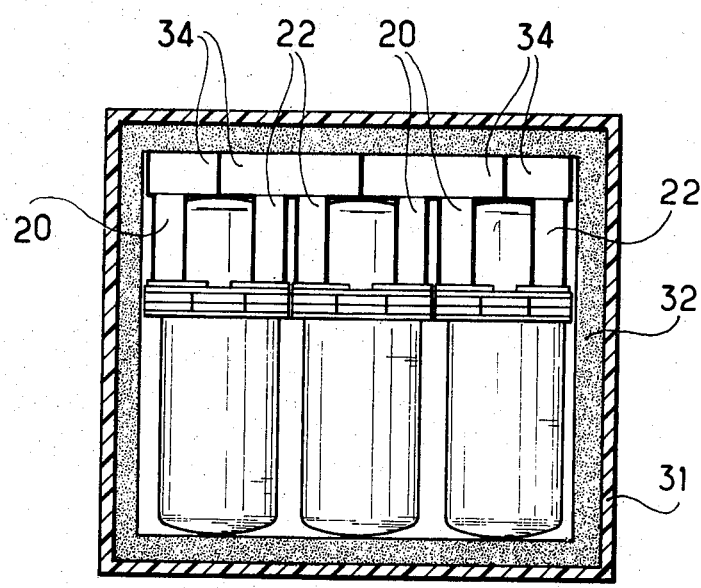
FIG. 7 is a vertical sectional view of FIG. 5 along line C—C.

FIGS. 5, 6 and 7 relates to the forming of an accumulator battery consisting of several accumulators similar to the one shown in the preceding figures.

In these figures, the battery is designated by reference 30. In the example described, it comprises twelve accumulators 1 which are connected up in series by connection of their positive and negative tabs. The battery 30 comprises a tank 31, for example, made of expanded polystyrene, whose walls are provided with heat-proof substance 32 made, for example of mineral wools. The accumulators 1 are arranged parallel to one another. Reference 33 designates a turbine producing air for ventilation. This air is diffused inside the battery by means of horizontal channels 34 into which the ducts 20 and 22 of each accumulator are connected. The ventilator air is expelled at 35.

The temperature regulating system consists of an expandable tube detector placed in the battery on the level of the upper end of the tube 3, acting mechanically so as to modulate the air flow by means of butterfly gates 36 and 37, the butterfly gates, moreover, completely stopping up and heat-proofing the air input and the air output when there is a complete stoppage of the battery. In the case where the battery is used as a means of propulsion for a vehicle, that hot air flow coming out of the battery can be partly or wholly drawn off for heating the cab of the vehicle.

The following figures are given by way of an example only, for calculating the heat-proofing:

Rock wool: thickness 40 mm.;
Expanded polystyrene: thickness 14 mm.

In these conditions, further use of the battery without further heating after a complete stoppage of less than ten hours can be anticipated, the temperature then being at least equal to 220° C. Below that temperature, it seems necessary to reheat the battery before being able to use it again. It is possible, for example, to contrive to reheat the battery with a hot air current flowing in the circuit normally used for cooling.

The air will be reheated, for example, by a system of electrical resistances, the power source possibly being a conventional lead battery, for example.

By way of an illustration having no limiting character, other characteristics of the battery are given as follows:

Open circuit voltage: 25 v.
Voltage at maximum power: 19.2 v.
Current intensity at maximum power: 270 A.
Discharging depth: 50%.
Total weight of sodium: 15.8 kg.
Total weight of sulphur: 29 kg.
Total weight of the system, not including reagent: 60.2 kg.
Total weight of the battery: 105 kg.
Maximum power output: 5.2 kw.
Power stored (discharge 3 hours): 15.6 kwh.
Practical power-to-weight capacity: 148 wh./kg.
Practical power-to-weight ratio: 49.5 w./kg.
Overall dimensions:
 height—56 cm.
 width—63 cm.
 length—112 cm.
Power of the ventilator turbine: about 100 watts.

It must be understood that the invention is in no way limited to the embodiments described and illustrated, which have been given only by way of examples. More particularly, without going beyond the scope of the invention, details may be modified, certain arrangements may be changed or certain means may be replaced by equivalent means.

What is claimed is:

1. In an electrical energy producing unit of the sulfur-sodium acculmulator type comprising a container member having disposed therein a plurality of tubes, at least a part of the lower portion of each of said tubes being adapted to function as a solid electrolyte, a liquid positive material surrounding the outer surfaces of said solid electrolyte portion of said tubes and impregnating an electrically conductive porous material in said container, a reservoir containing a supply of liquid active negative material, said reservoir being situated above said container and having a distribution chamber connected to its bottom through a manifold pipe for transmitting said liquid active negative material from said reservoir to the interior of each of said tubes, and connecting means for electrically connecting said positive and negative materials to positive and negative terminals, respectively; the improvement comprising temperature controlling means disposed between said reservoir and the upper ends of said tubes, said temperature controlling means comprising a conduit for the transmission of a fluid material capable of moderating the temperature inside said energy producing unit, said conduit having one wall which serves as a wall of said reservoir and a second wall which serves as a wall of said distribution chamber for said liquid active negative material.

2. The electrical energy producing unit of claim 1 further comprising heat exchange fins inwardly disposed within said conduit.

3. The electrical energy producing unit of claim 1 further comprising a passage through said conduit permitting transfer of said liquid active negative material from said reservoir to said distribution chamber.

4. The electrical energy producing unit of claim 1 further comprising temperature sensing means for controlling the flow of said temperature controlling fluid through said conduit.

5. The electrical energy producing unit of claim 1 wherein said temperature controlling fluid is cooling air.

6. The electrical energy producing unit of claim 1 wherein the upper part of each of said tubes is formed from alpha-alumina, and the portion of each of said tubes functioning as said solid electrolyte is formed of beta-alumina-sodium salt.

7. The electrical energy producing unit of claim 1 wherein the inside diameter of each of the upper portions of each of said tubes is smaller than the inside diameter of each of the lower portions of each of said tubes.

8. The electrical energy producing unit of claim 3 wherein said passage is provided with a flow limiting device for controlling the transfer of said liquid negative material between said reservoir and said distribution chamber.

References Cited
UNITED STATES PATENTS

| | | | |
|---|---|---|---|
| 3,404,035 | 10/1968 | Kummer et al. | 136—6 |
| 3,404,036 | 10/1968 | Kummer et al. | 136—6 |
| 3,413,150 | 11/1968 | Kummer et al. | 136—6 |
| 3,533,848 | 10/1970 | Winn | 136—83 R X |
| 3,679,480 | 7/1972 | Brown et al. | 136—6 |
| 3,245,836 | 4/1966 | Agruss | 136—83 R |

ANTHONY SKAPARS, Primary Examiner

U.S. Cl. X.R.

136—83 R